United States Patent
Averill et al.

[15] 3,674,852
[45] July 4, 1972

[54] PROCESS FOR PREPARING MESIDINE

[72] Inventors: Frederick John Averill; Norman Riley, both of Manchester, England

[73] Assignee: Imperial Chemical Industries Limited, London, England

[22] Filed: May 19, 1969

[21] Appl. No.: 826,004

[30] Foreign Application Priority Data

May 29, 1968 Great Britain..................25,777/68

[52] U.S. Cl..............................260/578, 260/577, 260/580
[51] Int. Cl..................................................C07c 85/00
[58] Field of Search..................................260/578

[56] References Cited

UNITED STATES PATENTS 2,039,391   5/1936   Carlston et al.........................260/128

3,123,644   3/1964   Olin.........................................260/578

OTHER PUBLICATIONS

Hill et al., "Industrial and Eng. Chem.," Vol. 43(7), 1579–1585, (1951).
Olah, "Friedel–Crafts and Related Reactions," Vol. II, Part I, pages 531– 533, (1964).
The Merck Index, 7th Ed., page 1439 (1960)
Wagner et al., "Synthetic Organic Chemistry," page 671 (1953)

Primary Examiner—Robert V. Hines
Attorney—Cushman, Darby & Cuhsman

[57] ABSTRACT

Manufacture of mesidine by isomerization of N,N-dimethyl o-toluidine or -p-toluidine at above 200° C. preferably in presence of a primary or secondary amine as reaction moderator and (when nonferrous lined apparatus is used) in presence of iron or a salt of iron.

8 Claims, No Drawings

PROCESS FOR PREPARING MESIDINE

This invention relates to a process for the manufacture of mesidine (2,4,6-trimethylaniline).

All the known processes for the preparation of mesidine are costly to operate. Manufacture by nitration of mesitylene (1,3,5-trimethylbenzene) and reduction of the product is costly because the starting material is expensive, and the yields produced by other known processes are low. Thus for example Ingold & Piggott (Journal of the Chemical Society 125 page 172) obtained mesidine in only 25 percent yield by heating phenyl trimethylammonium iodide.

According to the invention a process for the manufacture of mesidine comprises heating N,N-dimethyl-o- or -p- toluidine or a salt thereof at an elevated temperature in presence of a substance capable of promoting the isomerization of an N-alkylaniline to a nuclearly alkylated aniline.

Substances capable of promoting the said isomerization include metallic salts of acidic character, particularly halides, e.g. chlorides or bromides. Specific salts which are known to be effective include the halides of cobalt, aluminum, zinc and copper. Zinc chloride is the preferred metallic salt. More than one isomeriza-tion promoting substance may be used if desired, for example a mixture of two metallic halides e.g. a zinc chloride/aluminum chloride mixture.

In the process of the invention it is advantageous to use less than the stoichiometric amount of metallic salt, for example to use from 0.1 to 0.75 moles of metallic salt per mole of N,N-dimethyl-o or -p- toluidine.

It is also advantageous to carry out the process of the invention in the presence of a primary or secondary amine in order to moderate the vigor of the reaction. Such amines become N-methylated during the reaction and may then undergo rearrangement to produce nuclearly substituted amines. Thus aniline forms N-methyl- and N,N dimethyl-aniline which rearranges to N-methyl-o-toluidine and 2,4-dimethylaniline. Further N-methylation of these results in compounds which re-arrange to mesidine. It is therefore advantageous to use 2,4-dimethyl aniline as a reaction-moderating primary amine since this compound itself, when functioning as a reaction moderator, gives rise to mesidine. The proportion of primary or secondary amine though not critical, especially when 2,4-dimethylaniline is employed, may usefully be from 0.1 to 0.5 moles per mole of N,N-dimethyl-o- or -p-toluidine.

The temperature of heating may be at least 200° C., but the most effective temperature and duration of heating depend on the amount of isomerization-producing substance which is used. Thus using from 0.1 to about 0.5 moles of metallic halide (particularly zinc chloride) it is advantageous to carry out the heating in two stages, namely a first stage at 200°–240° C. in which isomerization of one methyl group takes place, and a second stage at 245°–260° C. in which the isomerization process is completed. Using from about 0.5 to 0.75 moles of metallic halide (particularly zinc halide) however the reaction proceeds smoothly on heating to 220°–250° C.

It is advantageous to carry out the process in a closed vessel, thereby avoiding loss of volatile compounds formed as intermediates. Pressure is, of course, generated in such a vessel and it will be understood that an autoclave will normally be used.

In iron or mild steel autoclaves at the temperatures indicated above the production of mesidine takes place steadily, for example during about 18 to 36 hours when zinc chloride is the isomerization promoting substance. In non-ferrous lined apparatus, however, such as enamelled autoclaves, although formation of N-methyl-2,4-dimethyl aniline readily takes place, further isomeriza-tion to produce mesidine occurs more slowly. When working in such apparatus therefore it is advantageous to operate in the presence of iron or an iron salt e.g. ferric or ferrous chloride. These accelerate the production of mesidine.

After carrying out the process of the invention mesidine may be isolated, for example by treatment with sufficient alkali to decompose any metal salt complex, separation of the crude product, and fractional distillation. High yields of mesidine are obtained.

The invention is illustrated but not limited by the following Examples in which the parts and percentages are by weight:

EXAMPLE 1

405 Parts of N:N-dimethyl-p-toluidine and 205 parts of powdered zinc chloride are heated with agitation in a mild steel autoclave to 260° C. and held at this temperature for 18 hours. After cooling the residual pressure is released and the zinc chloride complex is decomposed by the addition of 500 parts of 32 percent caustic soda solution diluted with 300 parts of water. After heating to 95°–100° C. for 2 hours the mixture is cooled, the free amine is separated and fractionally distilled giving a good yield of mesidine.

EXAMPLE 2

810 Parts of N:N-dimethyl-o-toluidine and 200 parts of powdered zinc chloride are heated with agitation in a mild steel autoclave to 245°–255° C. and held at this temperature for 18 hours. After cooling the residual pressure is released and the zinc chloride complex is decomposed by the addition of 500 parts of 32 percent caustic soda solution diluted with 300 parts of water. After heating to 95°–100° C. for two hours the mixture is cooled, the free amine is separated and fractionally distilled giving a yield of mesidine of 60 percent theory.

EXAMPLE 3

540 Parts of N:N-dimethyl-o-toluidine, 121 parts of 2,4-dimethylaniline and 204 parts of powdered zinc chloride are heated with agitation in a mild steel autoclave to 200°–220° C. and held at this temperature for 18 hours the pressure rising gradually to 50 lb./sq. in. The temperature is then raised to 250°–260° C. and held for a further period of 14 hours during which period the pressure rises to 220 lb./sq.in. After cooling the residual pressure is released and the zinc chloride complex is decomposed by the addition of 510 parts of 32 percent caustic soda diluted with 300 parts of water. After heating to 95°–100 C. for 2 hours the mixture is cooled, the free amine is separated and fractionally distilled. The yield of mesidine is 70.0 percent theory with a recovery of 7 percent of 2,4-dimethylaniline.

In place of 2,4-dimethylaniline in this Example there may be used aniline, N-methylaniline, p-toluidine, or N-methyl-2,4-dimethylaniline.

EXAMPLE 4

540 Parts of N,N-dimethyl-o-toluidine, 121 parts of 1,4-dimethyl aniline and 306 parts of anhydrous zinc chloride are heated in a mild steel or cast iron autoclave to 235°–240° C. and held therefor 20 hours, the pressure rising to 190 p.s.i. After cooling the residual pressure is released and the zinc chloride complex decomposed by the addition of, or by adding to 760 parts 32 percent caustic soda liquor diluted with 450 parts of water. After heating to 95°–100 ° C. for 2 hours the mixture is cooled, the crude oil separated and fractionally distilled. The yield of mesidine is 55.7 percent.

The reaction may be carried out at temperatures 10°–15° C. lower with longer reaction times or at higher temperatures with shorter times.

When this procedure is carried out in an enamelled autoclave, the reaction proceeds to N,methyl-2,4-dimethylaniline and then only very slowly to mesidine. Addition of iron or iron salts (ferric or ferrous chloride) results in the formation of mesidine in similar yield to that obtained in an iron autoclave.

The quantity of 2,4-dimethylaniline used in this Example is 0.25 mole per mole of N,N-dimethyl-o-toluidine. This quantity is not critical, but amounts of less than 0.1 mole may lead to difficulties in controlling the reaction, especially when operating on a large scale, and amounts greater than 0.5 mole slow down the reaction to an extent which is generally undesirable.

In place of N,N-dimethyl-o-toluidine its hydrochloride may be used.

EXAMPLE 5

540 Parts of N,N-dimethyl-o-toluidine, 100 parts of 2,4-dimethyl aniline, 100 parts of anhydrous zinc chloride and 100 g. anhydrous aluminum chloride are heated in an iron autoclave to 230° C. and the temperature is held for 24 hours. After cooling the residual pressure is vented off and the reaction complex is decomposed by adding to 2000 parts of water and making alkaline with 150 parts of 32 percent caustic liquor and heating at 90°–100° C. for an hour. The crude oil is separated off and fractionally distilled. Yield of mesidine is 48 percent.

EXAMPLE 6

810 Parts of N,N-dimethyl-o-toluidine, and 120 parts of anhydrous cuprous chloride are charged to an enamelled iron autoclave and heated to 240° C. and held for three hours. After cooling the oil is distilled giving a mesidine yield of 34 percent.

We claim:

1. A process for the manufacture of mesidine which comprises heating a toluidine derivative selected from the class consisting of N,N-dimethyl-o-toluidine, and N,N-dimethyl-p-toluidine at a temperature of about 200° C–260° C in the presence of a copper or zinc halide.

2. Process according to claim 1 wherein the zinc halide is zinc chloride.

3. Process according to claim 1 wherein the proportion of halide is 0.1 to 0.75 moles per mole of toluidine derivative.

4. Process according to claim 2 wherein the proportion of zinc chloride is 0.1 to 0.75 mole per mole of toluidine derivative.

5. Process according to claim 1 carried out in the presence of aniline, N-methyaniline, p-toluidine, 2,4-dimethylaniline or N-methyl-2,4-dimethyl-aniline in a proportion of 0.1 to 0.5 mole per mole of toluidine derivative.

6. Process according to claim 2 carried out in the presence of aniline, N-methylaniline, p-toluidine, 2,4-dimethylaniline or N-methyl-2,4-dimethyl-aniline in a proportion of 0.1 to 0.5 mole per mole of toluidine derivative.

7. Process according to claim 3 carried out in the presence of aniline, N-methylaniline, p-toluidine, 2,4-dimethylaniline or N-methyl-2,4-dimethyl-aniline in a proportion of 0.1 to 0.5 mole per mole of toluidine derivative.

8. Process according to claim 4 carried out in the presence of aniline, N-methylaniline, p-toluidine, 2,4-dimethylaniline or N-methyl-2,4-dimethyl-aniline in a proportion of 0.1 to 0.5 mole per mole of toluidine derivative.

* * * * *